United States Patent [19]

Barns-Slavin et al.

[11] Patent Number: 5,124,926
[45] Date of Patent: Jun. 23, 1992

[54] CARRIER MANAGEMENT SYSTEM HAVING ACCOUNTING REGISTERS

[75] Inventors: Barns-Slavin, Ileana; Richard E. Dinnis, Stratford; Alonzo T. Dukes, Bridgeport; David J. Taylor, Norwalk, all of Conn.

[73] Assignee: Pitney Bowes Inc., Stamford, Conn.

[21] Appl. No.: 487,086

[22] Filed: Mar. 2, 1990

[51] Int. Cl.⁵ .............................................. G07B 17/04
[52] U.S. Cl. ........................... 364/464.03; 177/25.15
[58] Field of Search ............... 177/25.15; 364/464.02, 364/464.03

[56] References Cited

U.S. PATENT DOCUMENTS

| | | | |
|---|---|---|---|
| 4,325,440 | 4/1982 | Crowley et al. | 177/25.15 |
| 4,393,454 | 7/1983 | Soderberg | 364/518 |
| 4,418,382 | 11/1983 | Larson et al. | 364/200 |
| 4,420,819 | 12/1983 | Price et al. | 364/900 |
| 4,495,581 | 1/1985 | Piccione | 177/25.15 X |
| 4,506,329 | 3/1985 | Duwel et al. | 364/464.02 |
| 4,506,330 | 3/1985 | Dlugos | 364/464.03 |
| 4,595,984 | 6/1986 | Daniels | 364/466 |
| 4,628,457 | 12/1986 | Manduley | 364/464.03 |
| 4,713,761 | 12/1987 | Sharpe et al. | 364/406 |
| 4,783,745 | 11/1988 | Brookner et al. | 364/464.02 |
| 4,839,813 | 6/1989 | Hills et al. | 364/464.03 |
| 4,872,119 | 10/1989 | Kajimoto | 364/464.03 |
| 4,980,542 | 12/1990 | Jackson et al. | 235/375 |

*Primary Examiner*—Parshotam S. Lall
*Assistant Examiner*—Edward R. Cosimano
*Attorney, Agent, or Firm*—Robert H. Whisker; David E. Pitchenik; Melvin J. Scolnick

[57] ABSTRACT

A register system such as a carrier management system has a scale for weighing parcels, and a computer for determining shipping costs of the parcels. The computer has a memory including one or more accounting registers. A user PROM having a unique identification number therein is insertable in the system, and an initialization program stores this number in the system memory. Transactions cannot be accounted unless the numbers in the PROM and memory compare. A further PROM is insertable in the system in order to enable the initialization program.

11 Claims, 6 Drawing Sheets

CARRIER MANAGEMENT SYSTEM HAVING ACCOUNTING REGISTERS

BACKGROUND OF THE INVENTION

This invention relates to register systems, and is more in particular directed to a carrier management system having at least one accounting register, and a method and system for improving the validity of data and security of such register.

BACKGROUND OF THE INVENTION

In the shipping of parcels, it is frequently desirable to make provision for shipping by more than one carrier. In current shipping practice, provision must be made for the shipping of parcels by two major carriers, such as the United States Postal System (USPS) and the United Parcel Service (UPS), a private carrier, as well as any of a large number of smaller private carriers. In prior tracking or recording systems, various data concerning parcels or groups of parcels to be shipped were entered by an operator, so that the information could be stored in the records of a memory. The "transactions" recorded included information relating to the shipment, such as, for example, the identification of the carrier, the number of packages in the shipment, the weight, address data, charges, date and time, invoice number, etc. Factors such as weight were entered either manually or automatically by a scale, while other factors such as zip code were generally entered by an operator by way of a keyboard. Such systems contemplated the provision in the programs of routines that determined shipping costs on the basis of the information that was input.

Systems of this type are disclosed, for example, in U.S. Pat. Nos. 4,325,440; 4,495,581 and 4,595,984.

SUMMARY OF THE INVENTION

The present invention is directed to the provision of an arrangement of the above type wherein the system is provided with accounting registers, and the validity of accounting, as well as security of the system, are ensured.

Briefly stated, the invention comprises a register system including a scale for providing weight signals corresponding to the weight of a parcel, and a computer system responsive to the signals for generating value signals corresponding to the cost of shipping the parcel, whereby each procedure of weighing a parcel and generating value signals corresponding thereto comprises a transaction. The computer system further comprises replaceable memory means and non-volatile memory means. The replaceable memory means has an identification number stored therein. The computer further comprises means responsive to receipt of the weight signals prior to generating the value signals for comparing the identification numbers stored in the replaceable memory means and the non-volatile memory means, and for inhibiting generating the value signals in the event that the compared numbers are not the same.

The replaceable memory means may be a PROM, and the nonvolatile memory means may be an $E^2$ ROM. The non-volatile memory means may be an accounting register for storing the value signals, whereby the value signals are not stored in the non-volatile memory means in the absence of a comparison of identification numbers in the non-volatile memory means and the replaceable memory means.

The scale preferably has a platform for receiving parcels to be weighed, with the replaceable memory means comprising a memory mounted beneath the platform. The identification number may include the identification of a user of the system, a unique identification of the scale, and/or the zip code of the location of the scale.

In accordance with a further embodiment of the invention, a carrier management system is provided including a scale for providing weight signals corresponding to the weight of a parcel to be shipped, and a computer system responsive to the signals for generating value signals corresponding to the cost of shipping the parcel. The computer system comprises at least one non-volatile accounting memory, a replaceable memory having an identification number stored therein, initialization means for storing the identification number from the replaceable memory in the non-volatile accounting memory, and means responsive to receipt of the weight signals for determining the correspondence between the identification numbers in the non-volatile memory and in the replaceable memory and, in response to the correspondence, for generating the value signals and storing them in the non-volatile memory. The storage of the value signals in the non-volatile memory is inhibited in the absence of the comparison.

The invention also provides a method for ensuring the security of an accounting system having a computer and a non-volatile memory including an accounting register. The method comprises coupling to the system a replaceable memory that has an identification number stored therein, storing the identification number from the replaceable memory to the non-volatile memory, comparing the identification numbers in the replaceable and accounting memories, and inhibiting access to the accounting register in the event that the identification numbers in the replaceable memory and non-volatile memory are not the same.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
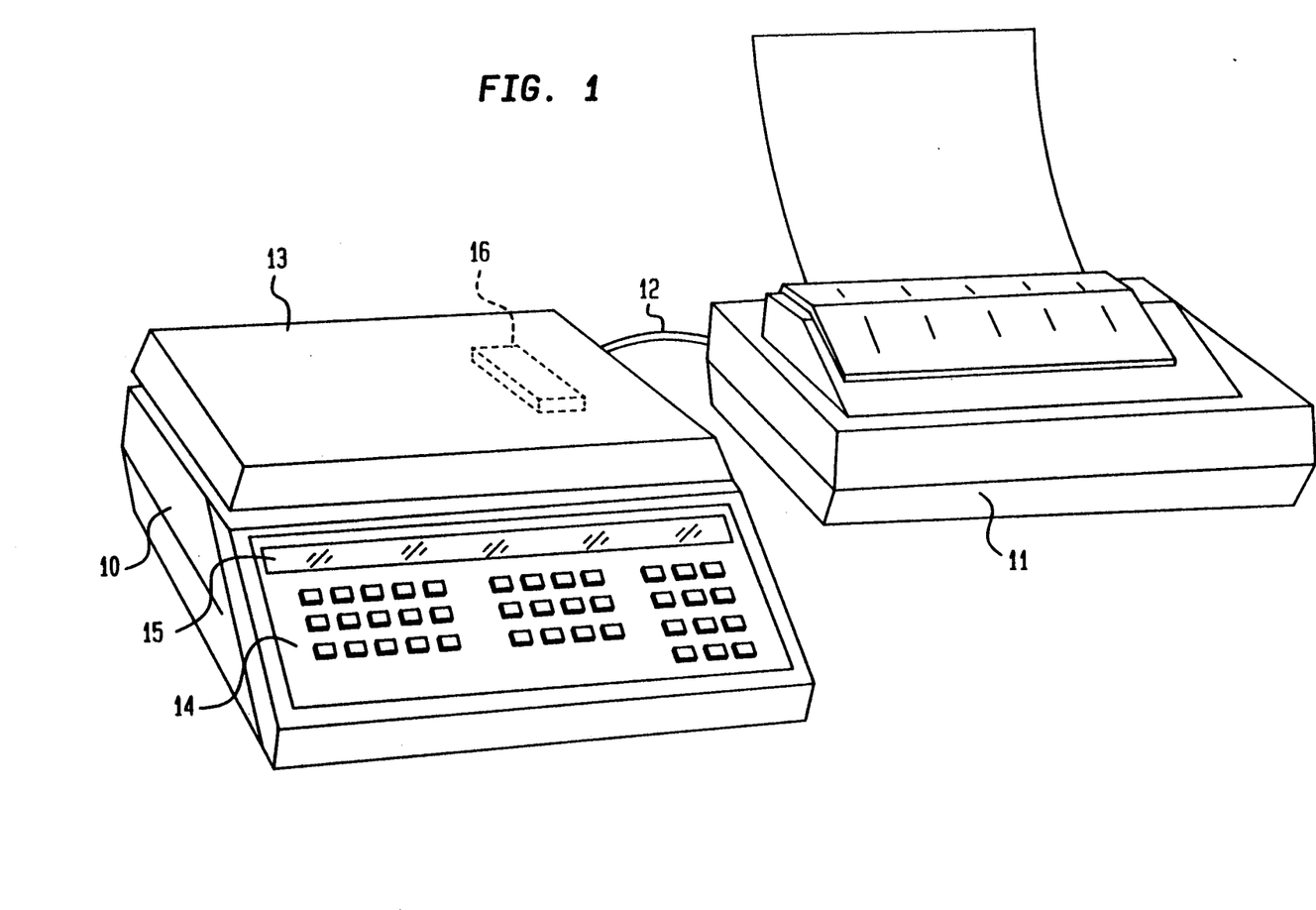
FIG. 1 is a perspective illustration of a carrier management system that may encorporate the present invention.

Referring now to the drawings, FIG. 1 is a perspective view of a carrier management system that may be employed in the present invention, including a console 10 and an optional printer 11 coupled thereto via cable 12. The console supports a platform 13 for receiving parcels to be weighed. The front panel of the console includes a keyboard 14 and a display 15. A replaceable board 16, illustrated in dashed lines, is mounted on or in the console below the platform, this board 16 having one or more ROM's or PROM's thereon. These ROM's store data that may be unique to the user of the system, and are replaceable by other ROM boards in order, for example, to enable a service person to gain access to critical setup programs stored in other NVM in the console.

Figure 2:
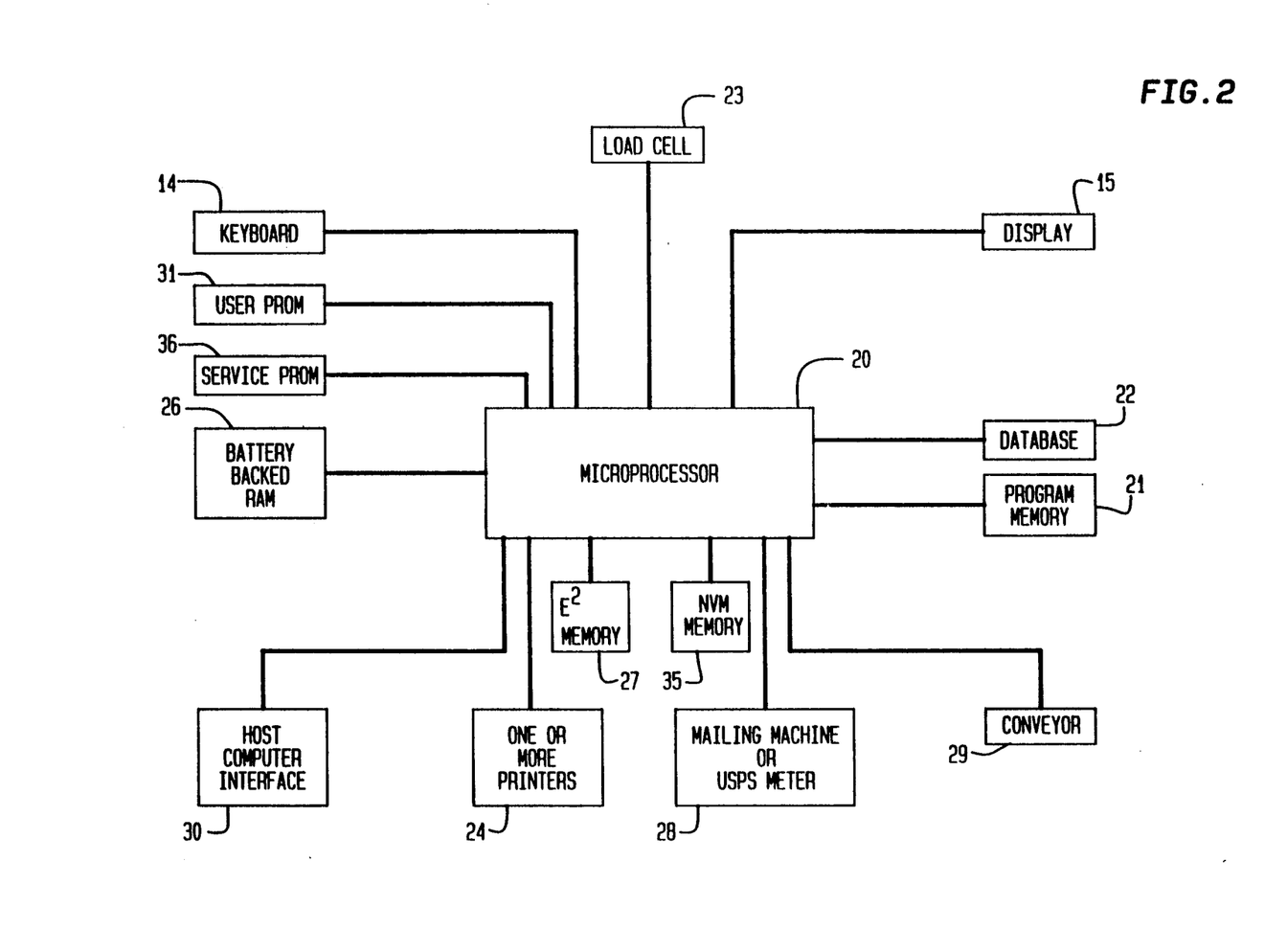
FIG. 2 is a block diagram of the system of FIG. 1.

FIG. 2 is a block diagram of the carrier management system of FIG. 1. The system incorporates a microcomputer including a microprocessor 20 having a nonvolatile program memory 21 containing the program for operation of the system, and a non-volatile database memory 22 having stored therein rate information of all carriers for which the system is expected to determine cost data. This latter memory is preferably replaceable in order to be able to update rate information, change or add carriers and/or classes of service, etc. A load cell 23 coupled to the platform applies data to the microprocessor related to the weight of a parcel on the platform.

The system further includes one or more printers 24, one of which may be the printer 11 illustrated in FIG. 1, and another of which may be internal to the system, if desired. The system may have a battery backed up RAM 26 (i.e. non-volatile) that defines a working accounting register, an $E^2$ ROM 27 (electrically programmable ROM), and further NVM memory 35, and may be adapted to be connected to a mailing machine or USPS meter 28, a conveyor 29, and/or a host computer interface 30. It is of course apparent that the various non-volatile memories may be of a different type than above discussed.

In addition, the system includes a further removable "user" ROM or PROM 31, (e.g. which may be on the board 16 illustrated in FIG. 1), as will be discussed. A "service" PROM 36 is also adapted to be removably coupled to the system, as will also be discussed.

The system in accordance with the invention is adapted to determine mailing or shipping charges for a parcel placed on the platform 13, and may be adapted to print a manifest, label, tag, etc. related the shipping of the parcel, and/or it may includes internal registers for accounting for the shipping of such parcels.

Figure 3:
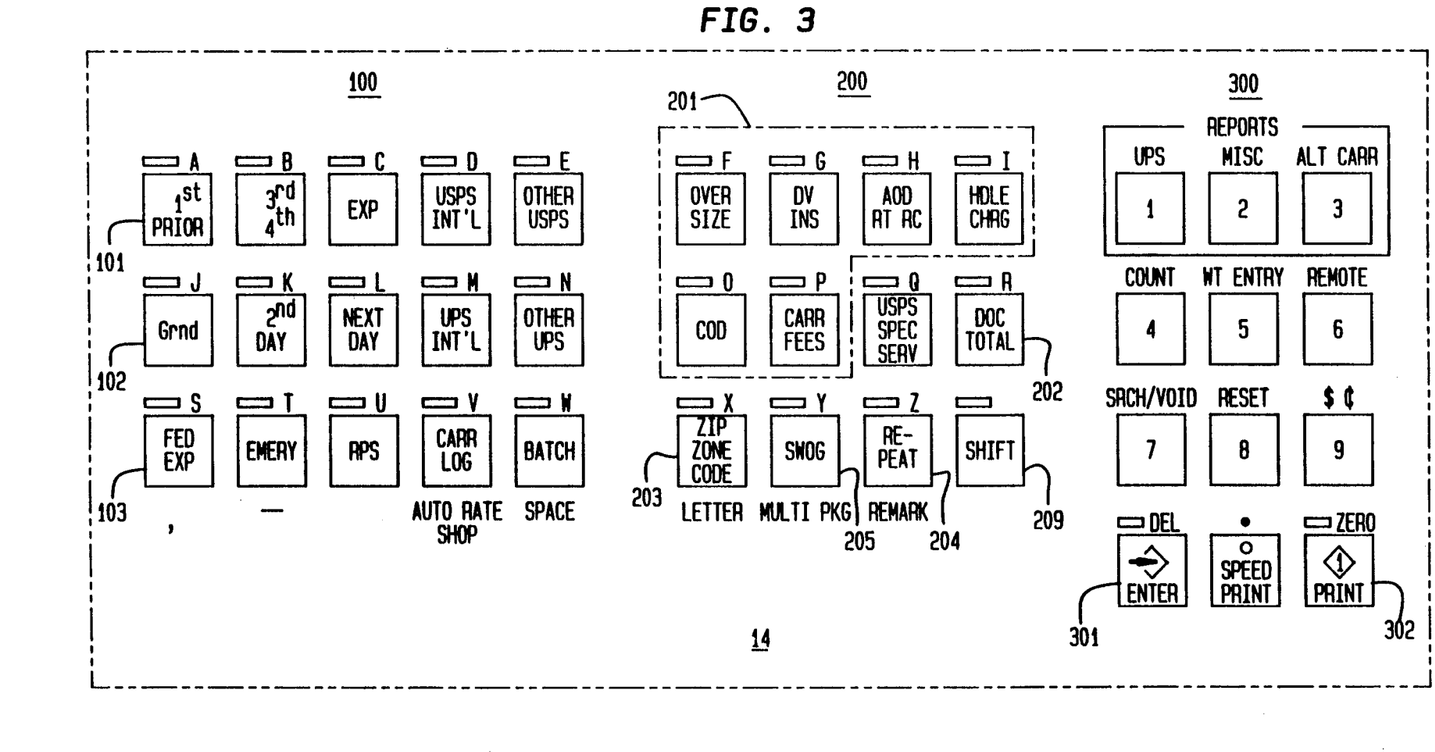
FIG. 3 is an illustration of the keyboard of the system of FIG. 1.

Referring now to FIG. 3, therein is illustrated the keyboard 14 of a preferred carrier management shipping system in accordance with the invention. The keyboard includes three sets 100, 200, 300 of keys. Each of the keys has a label printed thereon corresponding to the primary function of the key. Secondary and tertiary functions are printed above and below the keys showing additional functions that depression of the associated the keys may enable.

The group 100 of keys includes three rows 101, 102, 103 of keys, each row having five keys. These keys are known as the carrier/class keys, since their primary function is concerned with the selection of the carrier to use for shipping a given parcel, or the class of shipment that is to be employed for the shipment. For example, the keys of the first row 101 may be concerned with shipments by the USPS, and depression of any of these keys automatically selects shipping via USPS, with the specific class being determined by the key in the row that is depressed. Thus, depression of the first key in the row indicates that calculations should be made on the basis of first class or priority class mailing. These calculations are based upon the weight of the parcel. If priority class is to be selected, by the depression of this key, a response will be made to a later prompt for an input of the zip or zone of destination. Similarly, depression of the second key selects third or fourth class mail, depression of third key selects express mail, depression of the fourth key selects USPS international mail, and depression of the fifth key in the row selects other classes, the specific selection of other classes being in response to prompts on the display.

Depression of a key of the second row 102 of keys automatically selects UPS as the carrier, with the various keys of this row hence being directed to various classes of shipping via UPS.

One of the keys of the row 103, for example the fourth key therein, enables the user to select infrequently used carriers and/or classes from a menu that appears on the display. Such selection may require the user to calculate the shipping charges, since the rates for these carriers and/or classes may not be stored in the system.

Selection of the last key in the row 103 enables the user to process a group of parcels as a single transaction.

The second group 200 of keys includes a group 201 of toggle keys enabling the user to select or deselect special services. These keys may include, for example, a key for oversize parcels to require shipping charge determination to be also based upon the size of the parcel, a key requiring addition of insurance charges, a key including charges for a return receipt, a key for COD shipments, a key to call a menu for special services for alternate carriers, etc.

In addition, this group 200 of keys includes a key 202 to effect printing of accumulated values for a group of parcels, a key 203 to change the zip or zone identification, a key 204 to repeat the data of the previous transaction and a key 205 to process the parcel for shipment with other goods. In addition, the group 200 includes the SHIFT key 209 which enables selection of second and third functions of various ones of the other keys.

The third group 300 of keys enables numeric entry by the user, in response to prompts for such entries from the display, and also includes an ENTER key 301 for enabling entering of certain responses, and a PRINT key 302 for causing the printing of the manifest, label, tape, and/or the entering of data into internal registers, etc.

Most of the keys also have a second function printed above the key, the second function being effected upon depression of the SHIFT key 209 and the respective key. In addition, a third function is printed below a number of the keys, the third function being effected by depression of this key along with the SHIFT key (only in the event that depression of the key for effecting the second function would have not have resulted in a valid entry). If depression of a key for performing a primary function would have been invalid, such depression causes the selection of the second function, without depression of the SHIFT key, if the respective second function constitutes a valid response to a prompt at that time.

As is apparent in FIG. 3, the second functions of a number of the keys correspond to the letters A–Z. The second functions of the keys of the first row of the group 300, however, are commands for the printing of various reports, such as UPS, a miscellaneous carrier, or a carrier to be selected from a menu. The first key in the second row of group 300 may direct the system to count parcels of the same weight, the second key in this row may enable manual entry of the weight, and the third key in this row allows entry of weight from a remote scale.

Figure 4:
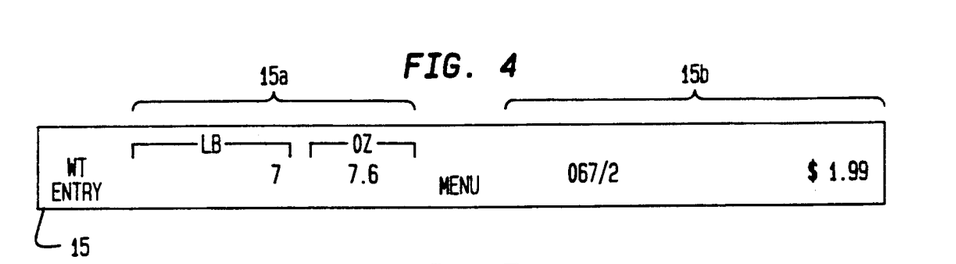
FIG. 4 is an illustration of the display of the system of FIG. 1.

FIG. 4 illustrates a display 15 that may be employed in the carrier management system of the invention. As illustrated, the display includes a section 15a that displays the weight of a parcel on the platform, for example in pounds and ounces. The other portion 15b of the display is employed for various alphanumeric messages. These messages may include various menus and lists of choices (that may be scrolled by the user), responses given by the user such as the zip code and zone messages shown in the figure, as well as prompts, etc., as well as, at the right end of the portion 15b, the shipment cost that has been calculated by the system.

In use of the above described system, i.e. not considering the specific features of the present invention, a parcel is placed upon the platform 13, and, in response thereto, a message is displayed prompting the user to enter an identification number of the parcel. When an identification number has been entered, the user may be optionally prompted to enter user definable, customer related information associated with the parcel to be shipped, as well as remarks concerning the parcel. Next the user is prompted to enter a carrier/class selection. In response thereto, the user depresses one of the keys of row 101 of keyboard section 10, if the parcel is to be shipped by USPS, or one of the keys of row 102 of keyboard section 100 if the parcel is to be shipped by UPS. The separate keys of these two rows correspond to different classes of service. Some of these keys may correspond to more than one class of service, in which case a menu is displayed and scrolled on the display to permit the operator to select the desired class of service. For example, the first key in row 101 may enable the user to select either first class or priority USPS mail service, and the second key in this row may enable the user to select either third or fourth class USPS mail service. Following this selection, the user is prompted to enter the Zip code, in response to which the user enters a 3 digit zip code (i.e. the most significant 3 digits of the Zip code). The system now displays the weight of the parcel at the section 15a of the display, the 3 digit Zip code and Zone at the section 15b of the display, and the shipping charges also at the section 15b of the display.

If desired, the user may now depress one or more of the special charge keys in the section 201 of the keyboard. For example, if the parcel is oversize, the first key in the first row of this section is depressed, following which the display shows the additional charges for an oversize parcel. After a predetermined time, the display will show the total charges for shipping the parcel including the oversize parcel charges. The other special charge keys function in a similar manner to add charges for other special services.

At this time, if the user is satisfied with the entries that have been made, the print key 302 is depressed and the parcel is removed from the platform, to complete the transaction. The system now proceeds to print any desired documents, tags, tapes or labels, and, if the program requires, to perform any necessary accounting functions.

As discussed above with reference to FIG. 2, the system includes a board 16 that has a customer or user PROM 31 thereon. This board is placed in a location, for example under the scale platform, that renders its replacement somewhat difficult, to inhibit its manipulation by unauthorized personnel. The PROM 31 has stored therein a unique identification of the user of the system, a unique identification of the system in which it is inserted, and as well as the zip code of the location from which the parcel is to be shipped (which may be the physical location of the system, but may be another location for example for drop shipping), this data being employed in the program of the system as stored in memory 21. The battery backed up memory 26 may be employed as an accounting register, for example in the manner employed in a postage meter, when an accounting routine in the program memory 21 is activated.

In addition, a service board or service PROM PROM 36 is releasably mounted in the system along with the user PROM. The service PROM 36 may include authorization data enabling the accounting registers of the system, as well as the accounting program. In addition, the service PROM encorporates data enabling the setting or resetting of the accounting registers in the battery backed up RAM 26.

Figure 5:
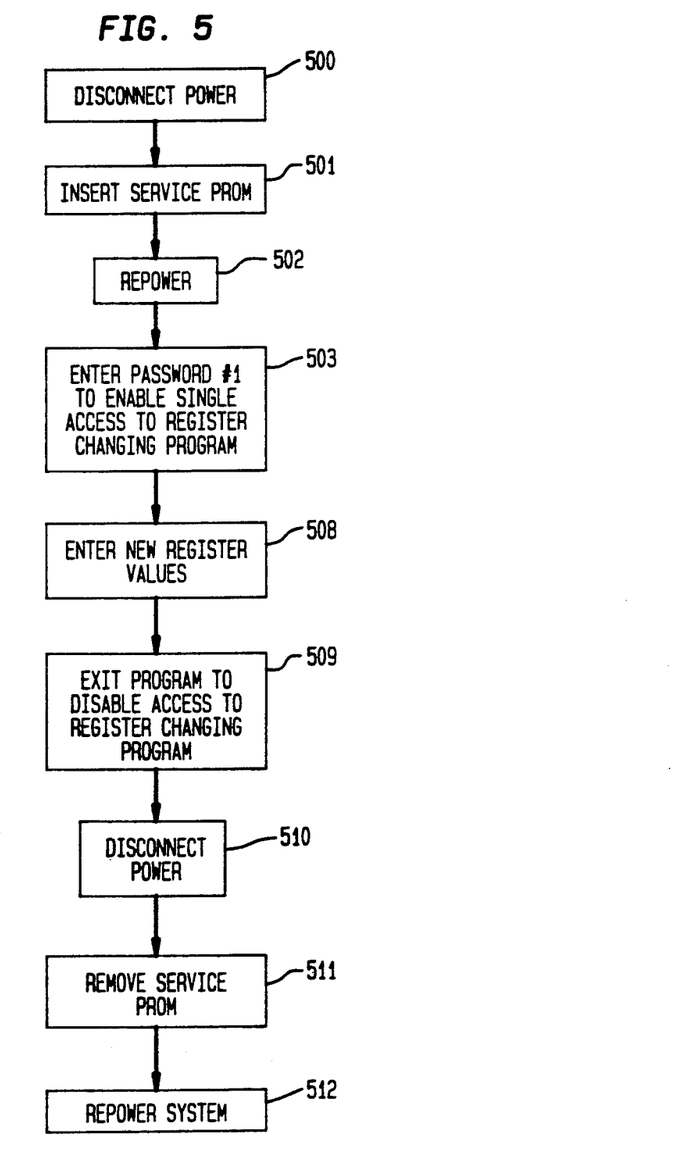
FIG. 5 is a flow diagram for use of the service PROM.
Figure 6:
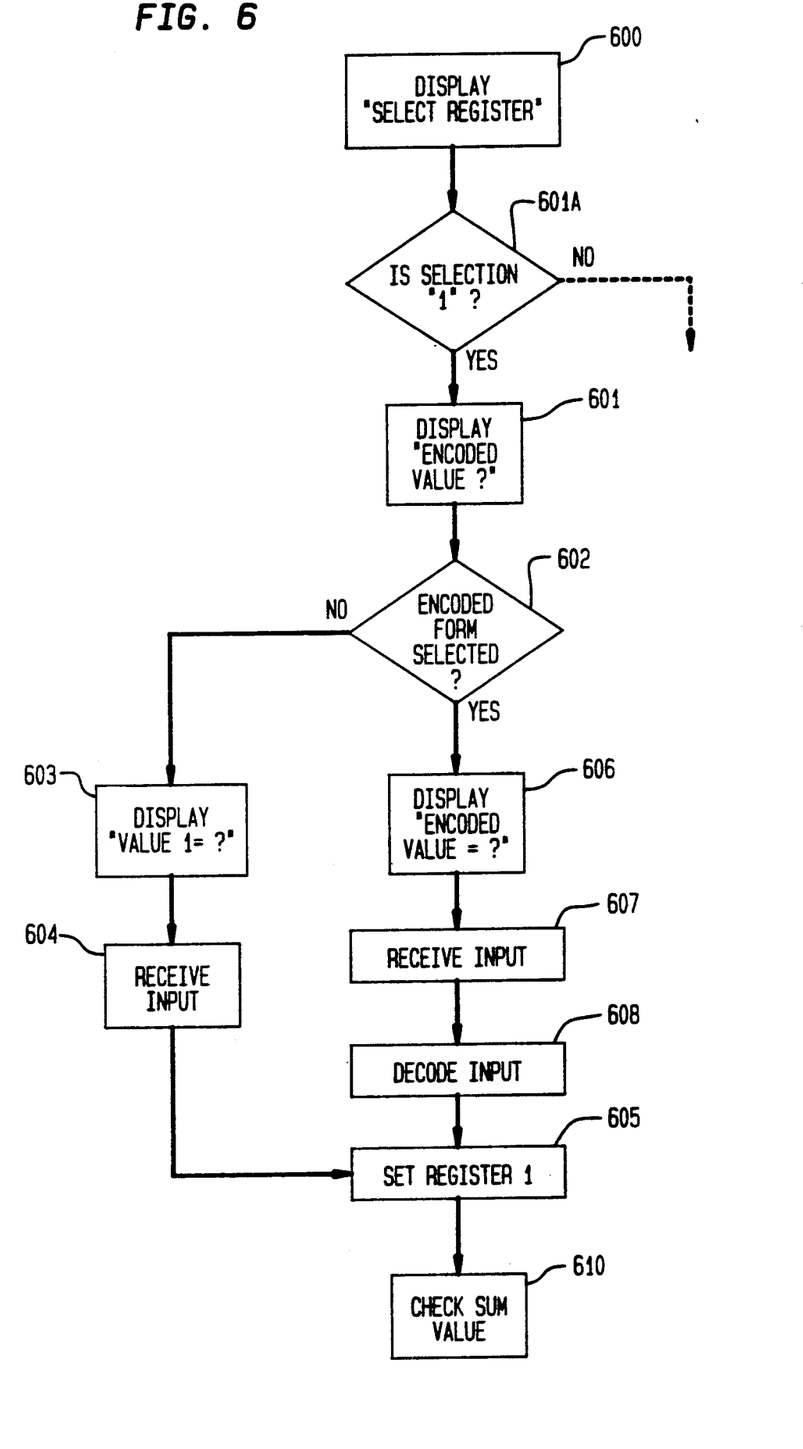
FIG. 6 is a flow diagram illustrating setting of registers in the system.

The functions and use of the service PROM 36 will be more clearly understood with reference to the flow diagram of FIGS. 5 and 6. FIG. 5 illustrates one procedure for employing the service PROM to enable a program in the program memory 21 that sets the accounting registers. As illustrated at block 500, in order to enable insertion of the service PROM it is first necessary to remove power from the system. Then, as indicated at block 501, the service PROM is inserted in a separate socket in the system. In a alternative arrangement, the user PROM 31 could be replaced by the service PROM. Power is again applied to the system at block 502. In one arrangement, the control of the service PROM is not effective until the user enters a predetermined password in the keyboard of the system, at block 503. This step may be eliminated, if desired, by providing the system program with a subroutine that automatically enables the functions of the service PROM to be activated if the PROM is physically present in the system. The password, if one is necessary, enables keyboard entries in the system to access the register changing program in the memory 21 a single time. The service PROM may thus have coded data therein that is recognized by the program to permit a single resetting procedure. The password may call up a menu to access other features of the system, or if no password is necessary, the repowering of the system, with the service PROM present, may call up such a menu. The service PROM may also have coded data therein to enable accounting programs in the program, and to enable use of the accounting registers, so that the system can internally account for transactions.

After the user has entered any necessary password, and performed any other steps, such as responding to menu entries on the display 15 to enable the register setting program, the desired register values are entered in the keyboard as indicated at block 508. Exit from the setting routine, at block 509, effects the setting of the registers to the value entered in the keyboard, and disables any further access to the setting program until once again authorized by the above procedure. The power may be now disconnected, at block 510, and the service PROM removed at block 511. The system may now be repowered, at block 512, for normal operation.

If the service PROM had been employed to temporarily replace the customer PROM, the customer PROM is of course reinserted in its socket prior to repowering the system.

FIG. 6 is a flow diagram of a program that may be employed for setting the accounting registers. This program is called by the entering of a password, at block 503 in the flow diagram of FIG. 5. Referring now to FIG. 6, if the accounting registers include more than one register, for example for two different types of service, such as normal service and drop shipment service, a prompt on the display requests a response of which register is to be reset, at block 600. The figure refers to setting of only one of the registers, a similar procedure branching from the test at block 601A for setting the other register. If register 1 is selected, at block 601A, a prompt is given at block 601 for the user to enter a response indicating whether the desired register value will be entered in coded form or in uncoded form. As will be seen, this selection provides the advantage that service personnel can enter an uncoded register value directly in the system, or a coded value from a tape generated by the system can be employed for register setting. If the response indicates an uncoded value will be entered, at block 602, the system prompts the user to enter the uncoded value, at block 603. The user then enters the uncoded register value at block 604, and the system sets the register "1" at block 605.

If the user has indicated that an encoded value was to be entered, at block 602, a prompt is given at block 606 for entry of the coded value. The desired value is entered at block 607, and the system decodes the entered value at block 608 and sets the register "1" in accordance with the decoded value, at block 605. The decoding is effected in accordance with a predetermined algorithm.

As discussed above, a similar procedure is provided for setting the desired value in the other register, if one is provided, and hence a detailed description of the resetting of this register is not necessary. As a final step in the program, before exiting the program at block 509 of FIG. 5, the program may compare the values of the settings of the two registers, at block 610, to determine if the settings of the register correspond to permissible values, e.g. if the sum thereof is equal to a control sum value stored elsewhere in the system. If the values are not permissible, the program may go into a fault routine (not illustrated), for example to permit the service person to enter different values.

In accordance with the invention, in order to ensure that the values stored in the accounting register or registers are correct, the accounting values are not only stored in the working registers of the battery backed up RAM 26 after each transaction, but are stored on a periodic basis to the $E^2$ memory 27. They may also be stored in further memory of the system, if desired, forming a shadow RAM (now shown). Prior to accounting for each transaction, the values stored in the battery backed up RAM 26 are first checked for internal validity and validity with respect to previous values, e.g. by comparing the sum of ascending and descending register values with a checksum value, and determining if the values have been lost due to loss of battery power. The values 20 are also compared with the values stored in the $E^2$ memory 27, as well as with corresponding values in any other memory. If the checks made of the register value indicate an error, the system may attempt to correct the error, for example by using the data in the shadow RAM to recover the corrupted data. If the error cannot be corrected in this manner, the computer indicates this fact on the display, for example indicating to the user that a register has failed. This may result in the aborting of the current transaction, if desired.

The checking of the register values may include the steps of:

1. Calculating and comparing the checksum values in each of the memories with a checksum value stored in the respective memory area;
2. Comparing each area of the respective memory with the corresponding area in the shadow memory;
3. Adding the ascending and descending register values in each memory to ensure that their total equals a control sum value stored in the respective memory area;
4. Checking the parcel ID of the parcel of the current transaction, in each memory area, to ensure that it is exactly one greater than the parcel ID of the parcel of the previous transaction;
5. Checking the date and time data stored in each memory area to determine if they are both valid, as well as checking the date and time data against one another to ensure that later transactions are identified with later dates.

The failure of a register, as determined by the checking of the registers, will prevent further transactions with respect to the carrier and/or class to which the register corresponds, but will not affect further transactions for other carriers and/or classes on the system.

After the register values have been checked and validated, i.e. found to be correct, the current transaction values are added to the values in the registers of the battery backed up RAM 26, and these values are checked with respect to previous values, checksums, etc., to ensure their validity. If they are found to be valid, the values are periodically stored in the $E^2$ memory 27 and any other memory, and the values are then preferably fully checked again as above discussed.

Figure 7:
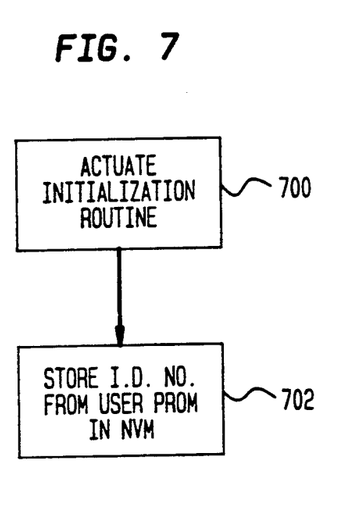
FIG. 7 is a flow diagram illustrating storing of an identification number from a user PROM into a non-volatile memory of the system of FIG. 1.

In accordance with a further feature of the invention, the program of the system, e.g. in the program memory 21, includes an initialization routine which may be responsive to actuation of determined keys of the keyboard when the service ROM is coupled to the system, or may be automatically responsive to the physical insertion of the service PROM 36 (FIG. 7, block 700). This initialization routine effects the storage of the identification number from the user PROM 31 into a nonvolatile memory of the system (FIG. 7, block 702), perferrably into the $E^2$ memory 27. Other data from the user PROM may also be stored in the system in this manner. In this embodiment of the invention, such storage of the user identification is required in order to enable the system to operate with the accounting registers.

Figure 8:
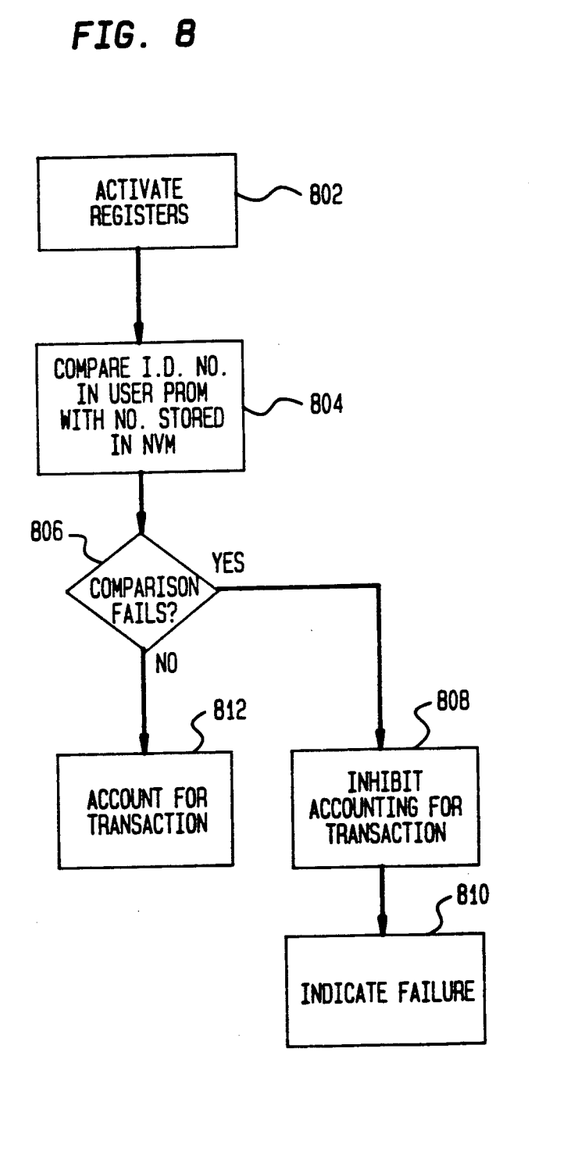
FIG. 8 is a flow diagram illustrating comparison of an identification number in a user PROM with an identification number stored in the non-volatile memory of the system of FIG. 1.

Once the registers are activated (FIG. 8, block 802), as discussed above, the user identification number stored in the $E^2$ memory and any other memory is also compared (FIG. 8, block 804) with the identification number in the user PROM 31, prior to accounting for any transaction for which the accounting registers must be used. Upon a failure of such comparison, the system will not account for the current transaction (FIG. 8, blocks 806, 808), and the display is controlled to indicate this failure by an appropriate message (FIG. 8, block 810). In other words, in accordance with this feature of the invention, a transaction cannot be accounted for if the user identification, or other identification, stored in the E² or other system memory, does not compare with the corresponding data in the user ROM currently coupled to the system. If the comparison of the corresponding data is successful, the transaction is accounted for (FIG. 8, blocks 806, 812).

As in the case of failure to account for a transaction due to failure of the accounting registers, such failure does not prevent use of the system for transactions that do not involve such registers.

Reference in the present disclosure to different memories includes different memory areas of a common memory. In addition, it is apparent that reference to identification numbers also includes alphanumeric, alphabetic and equivalent sequences While the invention has been disclosed and described with reference to a single embodiment, it will be apparent that variations and modification may be made therein, and it is therefore intended in the following claims to cover each such variation and modification as falls within the true spirit and scope of the invention.

What is claimed:

1. In a register system including a scale for providing weight signals corresponding to the weight of a parcel, and a computer system responsive to said signals for generating value signals corresponding to the cost of shipping said parcel, whereby each procedure of weighing a parcel and generating value signals corresponding thereto comprises a transaction, the improvement wherein said computer system further comprises replaceable memory means and non-volatile memory means, said replaceable memory means having an identification number stored therein, said non-volatile memory means having an identification number stored therein, said computer comprising means responsive to receipt of said weight signals prior to generating said value signals for comparing the identification numbers stored in said replaceable memory means and said non-volatile memory means, and for inhibiting generating said value signals in the event that the compared numbers are not the same.

2. The register system of claim 1 wherein said replaceable memory means comprises a PROM.

3. The register system of claim 1 wherein said non-volatile memory means comprises an E² ROM.

4. The register system of claim 1 wherein said non-volatile memory means comprises an accounting register for storing said value signals, whereby said value signals are not stored in said non-volatile memory means in the absence of a comparison of identification numbers in said non-volatile memory means and said replaceable memory means.

5. The register system of claim 1 wherein said scale comprises a platform for receiving parcels to be weighed, and said replaceable memory means comprises a memory mounted beneath said platform.

6. The register system of claim 1 wherein said identification number comprises the identification of a user of said system.

7. The register system of claim 1 wherein said identification number further comprises a unique identification of said scale.

8. The register system of claim 1 wherein said identification number comprises the zip code of the location of the scale.

9. In carrier management system including a scale for providing weight signals corresponding to the weight of a parcel, to be shipped, and a computer system responsive to said signals for generating value signals corresponding to the cost of shipping said parcel, the improvement wherein said computer system further comprises at least one non-volatile accounting memory, a replaceable memory having an identification number stored therein, initialization means for storing said identification number from said replaceable memory in said non-volatile accounting memory, and means responsive to receipt of said weight signals for determining the correspondence between said identification numbers in said non-volatile memory and in said replaceable memory and, in response to said correspondence, for generating said value signals and storing them in said non-volatile memory, whereby storage of said value signals in said non-volatile memory is inhibited in the absence of said comparison.

10. The carrier management system of claim 9 wherein said non-volatile memory comprises means for storing ascending and descending accounting register values.

11. A method for ensuring the security of an accounting system having a computer and a non-volatile memory including an accounting register, comprising coupling to said system a replaceable memory that has an identification number stored therein, storing said identification number from said replaceable memory to said non-volatile memory, comparing the identification numbers in said replaceable and non-volatile memories, and inhibiting access to said accounting register in the event that the identification numbers in said replaceable memory and non-volatile memory are not the same.

* * * * *